United States Patent [19]

Kovács

[11] Patent Number: 5,759,601
[45] Date of Patent: Jun. 2, 1998

[54] PROCESS FOR PREPARING FRIED POTATO PRODUCT FROM DEHYDRATED POTATO

[76] Inventor: László Kovács, 1310 E. Ocean Blvd., Long Beach, Calif. 90802

[21] Appl. No.: 662,110

[22] Filed: Jun. 14, 1996

[51] Int. Cl.⁶ .................................................. A23L 1/00
[52] U.S. Cl. ........................ 426/233; 426/438; 426/506
[58] Field of Search .......................... 426/233, 438, 426/439, 523, 506; 99/330

[56] References Cited

U.S. PATENT DOCUMENTS

| | | |
|---|---|---|
| 4,646,627 | 3/1987 | Bartfield et al. ............... 426/438 |
| 4,694,742 | 9/1987 | Dover ............................. 99/404 |
| 4,722,267 | 2/1988 | Galockin et al. ............... 99/357 |
| 5,102,674 | 4/1992 | Lehman .......................... 426/233 |
| 5,272,961 | 12/1993 | Campbell et al. ............. 99/353 |
| 5,404,796 | 4/1995 | Campbell et al. ............. 99/357 |

*Primary Examiner*—George Yeung
*Attorney, Agent, or Firm*—Pennie & Edmonds LLP

[57] ABSTRACT

This invention is related to a novel process and automatic apparatus for delivering formed, freshly fried potato products from a dehydrated potato granulate. The process includes the steps of preparing a dough by rehydrating the granulate, cutting the dough into pieces, frying the pieces of dough, and controlling the frying time by measuring the temperature of the frying oil during the frying time; computing the introduced energy amount by integrating the temperature of frying oil over the frying time; and terminating the frying time when the introduced energy amount equals a predetermined constant value. The pieces are removed from the oil when the frying time is terminated.

6 Claims, 2 Drawing Sheets

5,759,601

PROCESS FOR PREPARING FRIED POTATO PRODUCT FROM DEHYDRATED POTATO

FIELD OF THE INVENTION

This invention relates to a novel process and automatic apparatus for delivering formed, freshly fried potato products from dehydrated potato granulate, either for individual consumers, or for high capacity catering purposes. The frying principle is different from that of the prior art solutions. With respect to the apparatus, a new dough making unit is also developed and suggested.

BACKGROUND OF THE INVENTION

Several attempts were made to develop an automatic apparatus for providing various fried potato products.

Galockin et al. taught, in U.S. Pat. No. 4,722,267, a french fry vending machine which dispensed four different types of food stuffs, prepared from frozen potatoes. The need for storing frozen food permitted quite limited use in this case.

Campbell et al., in U.S. Pat. No. 5,272,961, disclosed an apparatus for vending french potato strips. This machine operated using fine grain potato powder which was stored in a hopper. The upper part of the machine required refrigeration for controlling humidity of the fine grain powder and for avoiding problems otherwise encountered with dispensing the powder. Similarly, a mixing mechanism (86) was also needed to ensure sufficient homogeneity of the rehydrated dough.

Dover, in U.S. Pat. No. 4,694,742, disclosed an automatic deep fat cooker. The intermediate dough was made of dehydrated potato powder. Dover noted that this method is very sensitive to deviations in cooking parameters such as time and temperature. As far as the quality of the product, the frying oil was required to be strictly controlled. This, however, was not easy to carry out, especially under alternating conditions.

SUMMARY OF THE INVENTION

It is an object of the present invention to provide an automatic system, which does not require frequent inspection, for producing formed potato pieces from dehydrated and granulated potato by the addition of water and a subsequent forming and frying operation.

Alternatively, it may be an object to provide a machine for use in applications where high output capacity is required, for instance in kitchens.

It is a further object of the invention to find a frying process for providing consistently good quality fried products.

This object is achieved by a process for preparing fried potato product from dehydrated potato which is carried out in successive cycles. The process comprised the steps of:

preparing portions of dough by adding water to a dehydrated granulated potato, forming portions of dough into predetermined shapes, making pieces of formed dough by performing a series of consecutive transversal cuttings, frying the formed pieces in edible frying oil received in a vessel which is heated by controlled electric power;

controlling the dwell time of the formed pieces in the frying oil as frying time in each cycle;

measuring the temperature of the frying oil during the frying time, computing an introduced energy amount with the use of a control unit for integrating the temperature of the frying oil on the frying time, terminating the frying time when the introduced energy amount becomes equal to or first exceeds a predetermined constant value, and removing the formed and fried pieces from the frying oil upon termination of the frying time.

Furthermore, an automatic apparatus is provided for delivering fried potato products from a dehydrated potato granulate product prepared by addition of water in successive cycles. The apparatus includes a frying unit equipped with a frying oil contained in a frying vessel with a heating element to heat the frying oil by controlled electric power. The frying unit controls the dwell time of the rehydrated potato product in the frying oil as frying time in each cycle. The apparatus further includes:

at least two temperature sensors located at different height levels inside the frying vessel of the frying unit; and a control unit to average the signals of the temperature sensors during frying time and to integrate the averaged temperature of the frying oil on a frying time, and thereby computing the amount of the introduced energy.

The control unit interrupts the frying when the computed introduced energy amount becomes equal to or first exceeds a predetermined constant value.

Furthermore, the invention relates to a dough making unit for use in an apparatus for delivering fried potato products from dehydrated potato granulate. The dough making unit includes a fixed lower plate and a rotary means provided with four cups uniformly spaced around the rotary axis of the rotary means, having four positions allocated to consecutive procedural steps of preparing dough. The rotary means is further provided with a rotating mechanism to forward the cups to a subsequent position by one quarter turn. The cups slip on the upper surface of the fixed lower plate, which constitutes the bottom of the cups, except in the fourth position. In the first position, the cups are filled with dehydrated potato granulate by a granulate metering mechanism. In the second position, the granulate is rehydrated by adding water to the granulate by a spraying means. In the third position, the rehydrated granulate is pressed to obtain its higher density by a preforming press. In the fourth position, the dough of the rehydrated granulate is pressed in several phases through a press mold by a cutting press, and the protruding pieces of dough are cut down after each phase by a knife unit.

BRIEF DESCRIPTION OF THE DRAWINGS

An embodiment of an automatic apparatus realizing the frying process according to the invention will now be described by way of example with reference to the accompanying drawings. However, it should be noted that this is not to be construed as limiting to the scope of the invention.

DETAILED DESCRIPTION OF THE DRAWINGS

Figure 1:
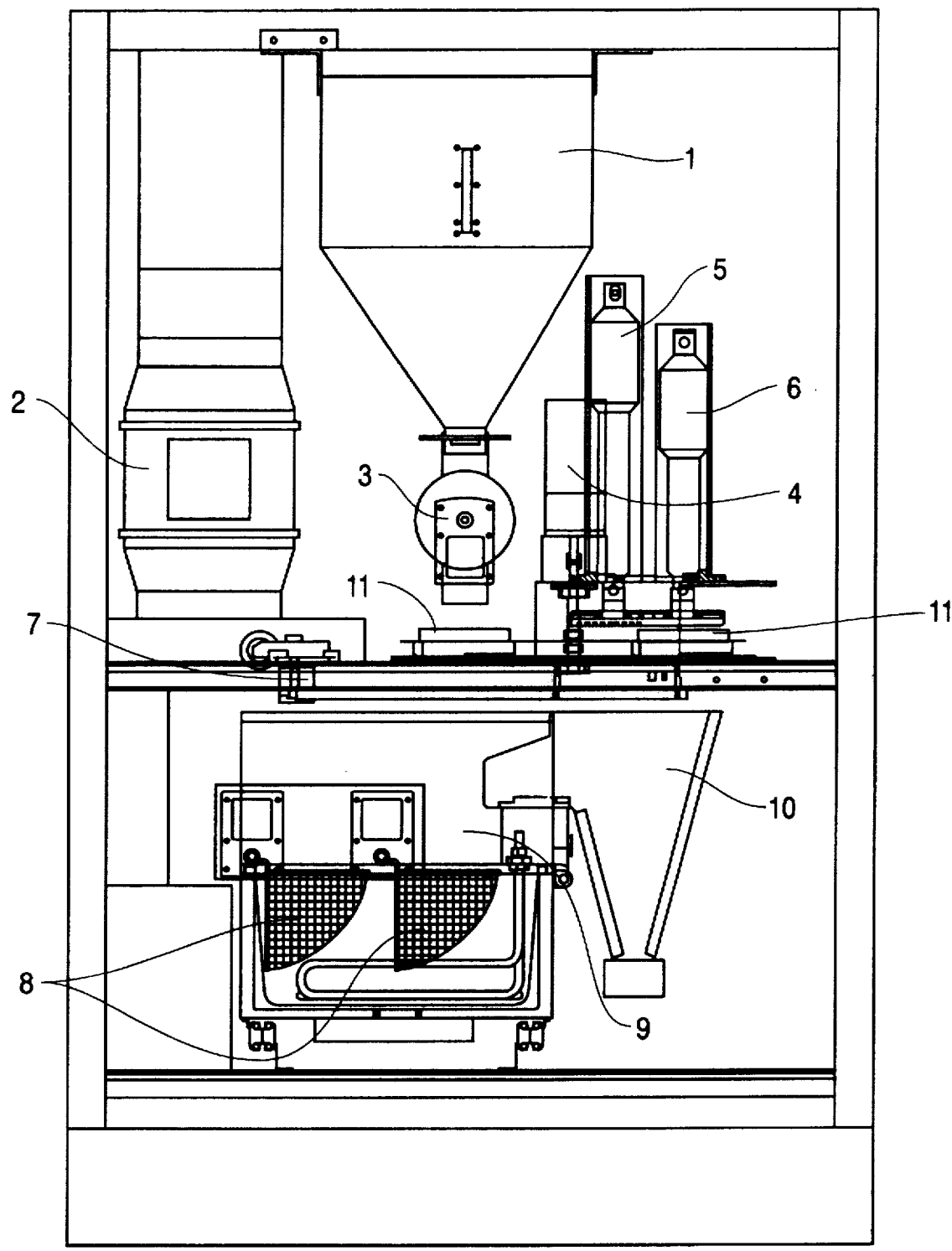
FIG. 1 is a front view of an embodiment of the automatic potato frying apparatus according to the invention.

An illustrative embodiment of the automatic frying apparatus is shown in FIG. 1 in front view, as an example. This apparatus includes a granulate container 1, a ventilator 2, a granulate metering mechanism 3, a main motor 4, a cutting press 5, a performing press 6, a knife 7, frying baskets 8, a frying unit 9, a conveyor belt 10, and several forming cups 11. A possible arrangement of these functional elements can be identified in FIG. 1.

Granulate container 1 serves for the storage of the starting potato product, that is the potato granulate. Use of granulate has the advantage that high air humidity will not make the stocked granulate lumpy. A fine grain powder, which was used in most of the known prior art machines, had a tendency to get lumpy or to become cemented together, which would affect dispensing of a portion from the stocked material. The granulate container 1 is made of a material generally admitted in the food industry. For facilitating the manipulation, there can optionally be provided means for visually checking the level of the granulate in the container. Preferably a window can be used.

The granulate metering mechanism 3 comprises three uniform racks and is constructed from vanes rotating about a horizontal axis. The rotating part is placed within a round housing having an inlet opening and an outlet opening. The mechanism 3 is driven by a motor which is not separately shown. In operation, the mechanism 3 acts like a bucket-wheel and transports downwardly one portion of granulate in each single cycle. Measurement of the granulate takes place during each 120° rotation of the rotating part around the axis. Each space between the vanes gets filled fully with granulate and is moved by its own weight. During the rotation, the granulate which was previously filled into the space between the vanes in a pre-determined volume flows out through a lower outlet opening. An optoelectrical sensor is used to monitor the operation of the apparatus and is used for putting the apparatus out of service or sending a signal to the control unit when the apparatus is running out of the granulate. The control unit is optionally placed at the inlet of the metering mechanism 3.

A dough making unit has been adapted to make a formed portion of potato from the dehydrated potato granulate. Its two main components are a lower plate and a rotary means 12. The lower plate remains in a still position, while the rotary means 12 forwards cups 11 slipping on the upper surface of the lower plate.

The round cups 11 are preferably made of stainless steel and fastened to the rotary means 12. The use of this material also facilitates cleaning. Cups 11 comprise a ring shaped portion having a cylindrical inner space. The ring shaped portion is closed at its bottom side by tightly joining it to the lower plate, which, however, has a finely polished plane upper surface on which the cups slip by rotation of rotary means 12. In this way the lower plate constitutes the bottom of the cups 11 slipping thereon.

Forwarding the cups 11 in steps can be advantageous since shaking of the dry granulate grains within the cups 11 makes the granulate level smooth. This can be realized while using a step-by-step motor drive.

Figure 2:
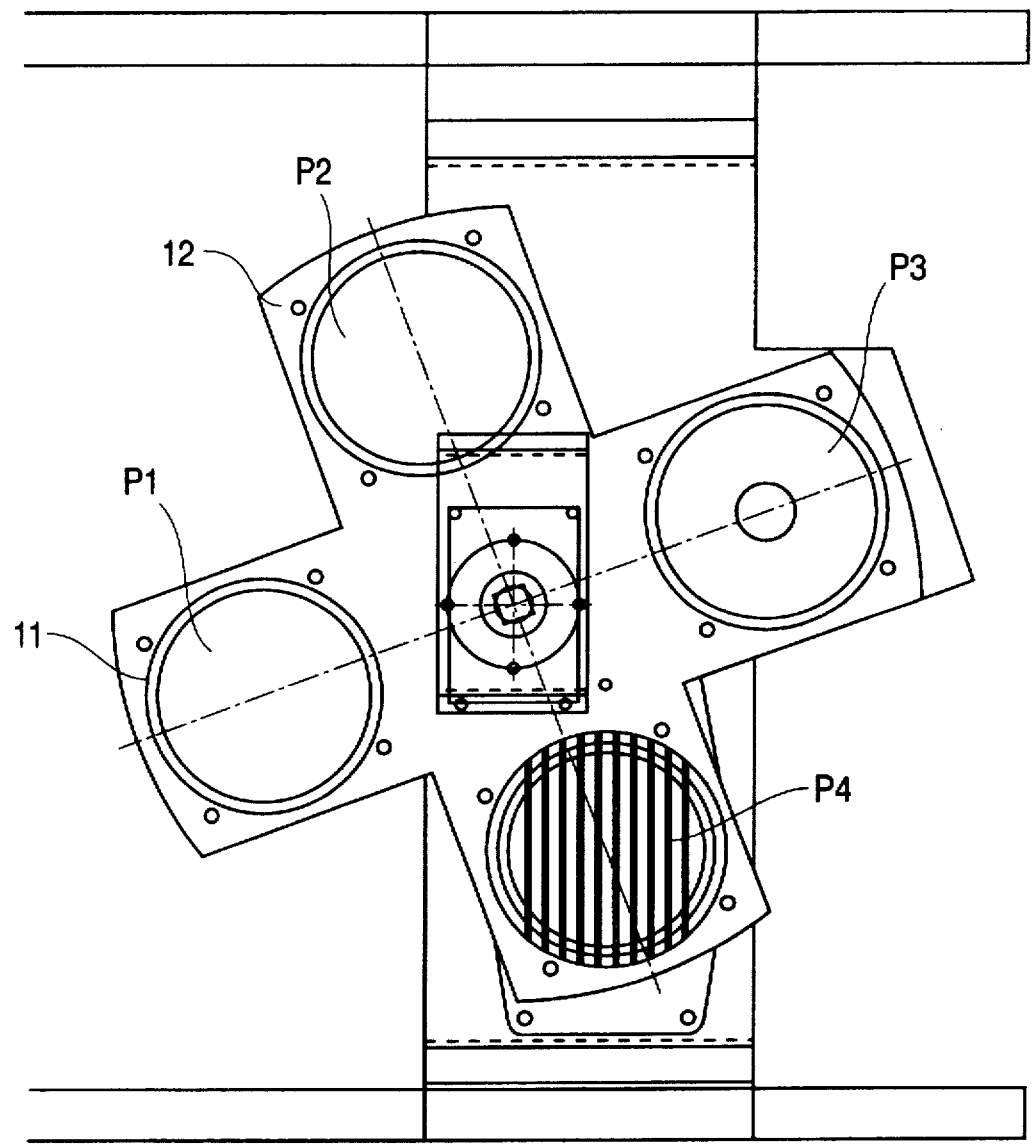
FIG. 2 is a bottom view of the rotary means of the dough making unit of said apparatus.

In FIG. 2, the rotary means 12 including the cups 11 is illustrated in bottom view from the side of the lower plate, without indicating the latter. The automatic machine of the embodiment shown has four different procedural positions P1–P4 to carry out the required steps of making formed mass or dough pieces. All positions P1–P4 are arranged by equal angles, 90°, around a rotating axis of the rotary means 12. The lower plate covers the bottom of the cups in positions P1–P4 except the fourth one. In this fourth position P4, a press mold is beneath the cup to determine the final form of the product. In order to obtain enhanced output capacity the dough making unit is constructed to use four cups. Thus, the necessary four procedural steps can be done simultaneously in four distinct procedural positions P1–P4 according to FIG. 2.

In the first position P1, granulate is dispensed by the granulate metering mechanism 3. In this feeding position Pi, the outlet opening of the granulate metering mechanism 3 is above the cup 11. The volume of granulate dispensed is smaller than the inner volume of a cup 11. In this way, the rim of the cup 11 prevents spreading of granulate grains.

The cup with a portion of granulate is then moved to the next position P2 by the rotary means 12. This will be achieved by a rotation of 90°.

In this position P2, water in an optimal volume and temperature will be dispensed and added to the granulate through a valve. Water is supplied by a water system. It has been found that the actual volume of the water added to the granulate has a considerable influence over the quality of dough obtained. So quantitative measuring of the water is to be carried out with the greatest possible exactness. For that purpose, a circulated water flow circuit is used advantageously in the water system. Continuous circulation ensures that, in case of opening of the valves, the water volume circulated in the pipes is not accelerated. The acceleration of the water mass would introduce a non-linear proportionality between the opening duration of the valve and the amount of water dispensed. This non-linearity can be avoided with use of a water system in which permanently circulated water will be split into a side pipe with an outlet valve. This side pipe is very short, thus the included volume of the water to be accelerated is negligible.

At the end of the side pipe, a rehydrated head sprays warm water on the surface of the dispensed potato granulate in an amount according to the portion. The spraying time is controlled by a controlling means or control unit such as a microcomputer. Fine spraying is important in order to avoid lumping of the resulting dough. The preferable embodiment of the rehydrating head is a commonly used adjustable spraying valve which is fixed to spray downwards.

In the next position P3 the humid dough, prepared in such a way, undergoes a pressing step to obtain a higher density. For this reason, a performing press 6 is mounted above the cup 11 in position P3. When this preforming press 6 is actuated the whole area of the cup 11 is pressed in a downward direction, while the bottom of the cup 11 containing the rehydrated granulate is kept closely covered by the lower plate.

Then, in the next position P4, the dough, compacted by pressure transferred by the preforming press 6, will be pushed through a press mold which forms each piece, determining their length and width. The height of the pieces can be controlled by properly coordinating the movement of the press pushing the dough through the press mold and a knife unit 7, which will be mentioned later. The press mold can be replaceable. Thus, various forms and shapes of the fried potato product can be obtained. In FIG. 2, a press mold can be seen for pressing pieces of right prism shape. The press mold in this case comprises tensioned, uniformly spaced parallel wires attached to a round frame. This frame is mounted in an aperture in the fixed lower plate at position P4. When a cup 11 is forwarded to the cutting position P4, just above the press mold in the lower plate, a cutting press 5 will be actuated. This cutting press 5 is provided with a flat or reliefed pressing plate at its lower end. The pressing plate is round and fits into the inner diameter of the cups 11.

The preferred embodiment of the dough making unit performs pressing of the prepared dough in several phases, and after each phase the knife unit 7 cuts down the protruded pieces of dough. Three phases can be advantageously applied. The cutting press 5 is actuated by an appropriate electromechanical actuator suitable to linearly move the pressing plate in adjustable length steps. Punctual stopping of the pressing plate in each phase is essentially important from the point of quality of consecutive frying. Therefore, the press used for pushing the dough through the press mold is preferably provided with an abutment or the like so as to stop the movement of the pressing plate of the cutting press 5.

The knife, included in the knife unit 7, is a tensioned stainless steel wire which is mounted on a frame. For the sake of enhanced stability, the knife preferably slides on a reinforcing arm, thus ensuring a minimal gap underneath the press mold, which is under cup 11 in position P4. The knife unit operates with axial rotation when the wire knife cuts down the pieces of protruded dough by pressing downwards through the press mold.

Before starting up the cutting press 5, a conveyor belt 10 is activated and, during cutting, transfers the falling, formed pieces of semi-finished product into the frying unit 9. The conveyor belt 10 and its driving can be realized according to any construction known from the prior art. In the embodiment shown in FIG. 1, cutting is carried out inside the housing of conveyor belt 10, thus ensuring the removal of any possibly developing waste. The waste moves into the waste collecting container located in the bottom part of the unit. Collection of the waste is helped by the elastic rim positioned near the edge of conveyor belt 10.

Frying unit 9 is housed in a lower and in an upper insulated housing respectively. The lower and upper housings are heat-insulated and are provided with a double casing. In the lower insulating housing of the frying unit 9 an oil containing frying vessel is inserted, which vessel is made of stainless steel and equipped with an outlet valve. The upper insulated casing and the housing of the heating wire and of the temperature sensor are mounted on a hinge and attached to the lower insulated casing on the right side. The moveability of the two units ensures the easy cleaning and maintenance of the frying unit 9. After turning out the upper insulated casing in which two baskets 8 are situated on motor driven rotating shafts, the baskets 8 can be lifted out for cleaning after releasing the fastening. After lifting out the baskets 8, the electric heating unit can also be turned out, thus allowing the removal of the corrosion resistant steel lining of the frying vessel. Two temperature sensors mounted inside the oil containing frying vessel serve to control the oil temperature. At the same time, they maintain the operating oil level in the frying vessel. The temperature sensors are positioned at different height levels, thus ensuring not only the more reliable measurement of the frying oil temperature by averaging of two values measured on two locations, but on the principle of a significant difference observed between the two values, recognizable by continuous detection, the conclusion can be drawn that the oil level has dropped below the temperature sensor located higher. In that case frying oil can be added into the frying vessel from a supplement oil container. For that purpose preferably a predetermined portion of additional oil is introduced. After a short pause which allows for equalization of heat distribution by mixing, the introduction of oil may be repeated, perhaps several times, until there is a significant decrease in difference between the temperatures indicated by the two temperature sensors. The difference may be, for example, a difference lower than 10° C. normally, and the decision threshold difference value can be set, for example, to 20° C.

The output signals of the temperature sensors are connected to a control unit which calculates an average value of these signals. The frying time starts when a portion of the formed and cut pieces drop into the frying oil in the frying vessel. One of the tasks of the control unit is to integrate the averaged temperature of the frying oil over the frying time, and thereby compute the amount of the introduced energy. When the amount of this computed introduced energy becomes equal to or first exceeds a predetermined constant value, the control unit controls the frying unit to stop the frying process. The control unit thereby controls the interruption of frying, when the basket with the potato pieces will be removed from the hot frying oil in the frying vessel.

Frying unit 9 includes preferably a security switch functioning on the principle of gas expansion. The security switch cuts off the apparatus in case of technical defects.

At the beginning of the frying process the formed pieces of potato are transferred to the first basket 8 and are held here until about the first half of the corresponding frying time. Then the basket is turned by the revolving of the motor, and the potato is transferred into the second basket 8, where the second half of frying takes place. The fully fried potato pieces are subsequently transferred into the finished product dispensing chute. The use of two baskets 8 allows the initiation of frying based on a new order before fully finishing frying of the preceding order.

Use of more than two, such as a plurality of baskets 8, provides enhanced output capacity. This is the case when a machine of high output capacity is desirable, for instance for kitchen or catering purposes. In this embodiment in continuous operation, all positions P1–P4 of the dough making unit and all of the baskets 8 work simultaneously.

The principal solution of frying is based not on the uniform temperature or on constant time, but rather a control unit or a computer controls the amount of energy introduced into the frying system by the simultaneous observation of time and temperature parameters. The control unit or computer equalizes in each cycle the energy amount, for example, from the temperature conditions subsisting at the starting of the cycle. This ensures uniform quality frying of each portion. This feature is important because the given apparatus exerts control in the range of ±10° C. about the optimal operating temperature. This feature compensates not only for the inequalities arising in the actual heating power of the frying oil, but also the inequalities caused by consecutive orders following rapidly upon each other and by random operating cycles. The computer determines the termination of frying time when the calculated amount of introduced energy becomes equal to or first exceeds a predetermined constant value, which is previously set. This value can be set in most of the cases by an empiric way.

When several baskets 8 are used, also several frying times are to be handled, and the termination of frying times should be separately calculated for the consecutive potato portions, i.e. for each basket 8.

Motors, moving baskets 8 and conveyor belt 10 are mounted on the upper housing. The conveyor belt hangs on the lower insulating casing. While the frying unit of prior art automatic apparatuses could be lifted out and replaced as a whole, the frying unit 9 of the apparatus according to the present invention is constituted from elements that can be lifted out and replaced separately. Thus baskets 8, heating element and the oil recipient frying vessel can be separately handled, pivoted about an axis, then removed. That is an important advantage in view of the considerable weight of frying units which are furnished with heat insulation, and which are handled in the case of traditional automatic apparatuses, by maintenance personal.

In case of a vending machine, a paper cup delivering mechanism can be located on the door of the apparatus.

Paper cups may be arranged in columns and stored until delivery of the finished product. At the delivery point a paper cup dispenser drops the paper cups one by one to the finished product entry point through a tube.

The fried potato leaving the fryer moves, for example, into a trough like finished product dispensing chute. After detecting the delivery of the paper cup and the presence of the cup in the delivery space, the fried potato is pushed through the introducing aperture in the paper cup dropping tube and from here, gravitates into the paper cup. In order to push the potato through the tube, the finished product dispensing chute is rotated (raised) about a point of rotation near the paper cup dropping tube by means of a motor. The careful selection of the diameters of the paper cup and of the paper cup dropping tube ensures the waste free dispensation of the product into the paper cup. Preferably, the inner diameter of the dropping tube is slightly larger than the largest outer diameter at the aperture of the paper cup. When the diameter difference is smaller than the smallest diameter of smallest occurring fried potato product, then each piece is dispensed in the paper cup. The finished product is delivered for the consumer through a door on the opposite side of the introducing part of the finished product dispensing chute.

However, in case of kitchen or catering use, when typically a quite large quantity of the freshly fried potato product is required to be served within a short time, the output of the machine can be different. The consecutive portions of fried potatoes can be collected in a bigger container.

The exhaust system comprises a built in exhaust ventilator 2, a preliminary filter, and a main filter to discharge oil vapor and excess heat from over the frying unit 9.

A main electric unit distributes and supplies supply voltage to the units using a main voltage and to the supply unit producing low voltage.

The control means can be, for example, a microcomputer which also generates any further control and check signals required for the operation of the apparatus and allows the coordinated operation of different units.

Further, optional units, like cleaning units with a waste water container, or a coin or card accepting unit, in case of vending machines, can also be applied. The apparatus may be provided with a self-diagnostic system, facilitating the maintenance and serviceability. These, however, will not affect the new features of the machine, namely the frying principle based on integrating the introduced thermal energy, the dough making unit with a still lower plate and a rotary means, and the frying unit with multiple baskets.

The system arrangement constituted from the above described units allows the installation similar to that of the well-known automatic apparatuses, or alternatively as a kitchen machine of high output capacity.

What is claimed is:

1. A process for preparing fried potato product from a dehydrated potato granulate, being carried out in successive cycles, each cycle comprising the steps of:

preparing a portion of dough by adding water to a dehydrated potato granulate, forming the portion of dough into a plurality of predetermined shapes, cutting said formed dough into a plurality of pieces by performing at least one consecutive transversal cutting, frying said formed pieces in an edible frying oil received in a vessel, said frying oil heated by controlled power;

controlling dwell time of said formed pieces in the frying oil as a frying time by:

measuring at least one temperature of the frying oil during the frying time, computing an introduced energy amount with a control unit which integrates the temperature of the frying oil over the frying time, and determining a terminating time when the introduced energy amount becomes equal to or first exceeds a predetermined constant value, and removing said formed and fried pieces from the frying oil at about the terminating time.

2. The process according to claim 1, wherein a metering mechanism dispenses said granulate.

3. The process according to claim 2, wherein said metering mechanism comprises a plurality of racks formed from vanes rotating about a horizontal axis.

4. The process according to claim 1, wherein water is added by metering exactly a volume of hot water and spraying out a dose of water downwards by means of a spray head over a portion of dehydrated potato granulate previously fed into a cup.

5. The process according to claim 4, wherein the exact metering of hot water is carried out by means of a circulated liquid circuit.

6. The process according to claim 1, further comprising, each cycle the steps of:

filling a cup (11) with a dehydrated potato granulate;

adding water to said granulate in said cup by a spraying means to prepare said dough;

pressing the rehydrated granulate by a preforming press (6) to obtain a higher density dough; and pressing the dough through a press mold by a cutting press (5) in several phases to form a plurality of protruding pieces, and cutting down, after each phase, the protruding pieces of dough.

* * * * *

UNITED STATES PATENT AND TRADEMARK OFFICE
CERTIFICATE OF CORRECTION

PATENT NO.   :   5,759,601

DATED        :   June 2, 1998

INVENTOR(S)  :   KOVACS

It is certified that an error appears in the above-identified patent and that said Letters Patent is hereby corrected as shown below:

Column 8, claim 6, line 1, after "comprising," insert --in--.

Signed and Sealed this

Second Day of February, 1999

Attest:

Attesting Officer

Acting Commissioner of Patents and Trademarks